United States Patent [19]

Baron et al.

[11] Patent Number: 5,081,791

[45] Date of Patent: Jan. 21, 1992

[54] SUPPORT FOR OUT-OF-GROUND CULTIVATION COMPRISING SUPERABSORBENT PARTICLES AND METHOD OF PRODUCTION

[75] Inventors: Gerard Baron, St Laurent Du Var; Jacques Vuillemin, La Gaude, both of France

[73] Assignee: Beghin-Say S.A., Thumeries, France

[21] Appl. No.: 93,023

[22] Filed: Jul. 29, 1987

[30] Foreign Application Priority Data

Nov. 29, 1985 [FR] France .................. 85 17741

[51] Int. Cl.⁵ ............................. A01G 9/02
[52] U.S. Cl. ........................ 47/66; 47/73; 47/59
[58] Field of Search ............ 47/9, 25, 32, 66, 73, 47/84, 56, 59, DIG. 10; 604/368, 369, 365

[56] References Cited

U.S. PATENT DOCUMENTS

| | | | |
|---|---|---|---|
| 2,039,442 | 5/1936 | Mulford | 47/73 |
| 3,555,728 | 1/1971 | Herns | 47/9 |
| 3,733,745 | 5/1973 | Ingerstedt et al. | 47/56 |
| 3,900,378 | 8/1975 | Yen | |
| 3,961,444 | 6/1976 | Skaife | 47/84 |
| 3,962,823 | 6/1976 | Zipperer | 47/73 |
| 4,051,086 | 9/1977 | Reid | 47/DIG. 10 |
| 4,209,945 | 7/1980 | Dent et al. | 47/84 |
| 4,286,408 | 9/1981 | Manno | 47/56 |
| 4,357,884 | 11/1982 | Rast | 47/73 |
| 4,539,038 | 9/1985 | Gombert | 47/9 |
| 4,579,578 | 4/1986 | Cooke | 47/DIG. 10 |

FOREIGN PATENT DOCUMENTS

| | | |
|---|---|---|
| 2400833 | 3/1979 | France . |
| 2416643 | 9/1979 | France . |
| 2543001 | 11/1985 | France . |
| 2115211 | 5/1987 | Japan .................. 47/9 |
| 978588 | 12/1964 | United Kingdom . |
| 8402827 | 8/1984 | World Int. Prop. O. . |
| WO1418 | 4/1985 | World Int. Prop. O. . |

Primary Examiner—Danton D. DeMille
Attorney, Agent, or Firm—Briener & Briener

[57] ABSTRACT

The invention relates to the field of out-of-ground cultivation, and more precisely to a cultivation support comprising superabsorbant particles. According to a preferred embodiment, the support is comprised of an envelope (2) consisting of two sheets (3, 4) of polyethylene welded at their edges. The envelope comprises a layer of superabsorbant particles (8) provided between two sheets of cellulose wadding (9). When using the support, openings are made at regular intervals and cultivation plant-containing lumps of earth are inserted therein, and watering is carried out with nutrient solutions. Application for out-of-ground cultivation.

12 Claims, 3 Drawing Sheets

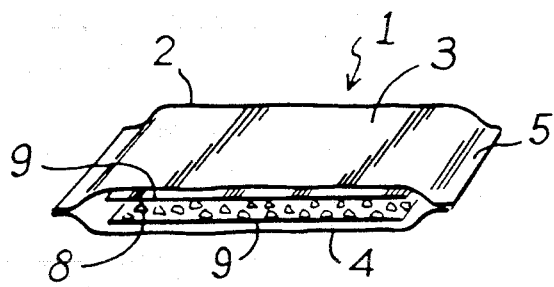
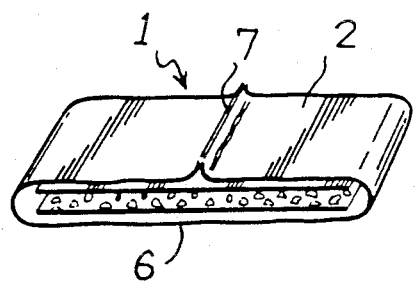
Fig_1a   Fig_1b
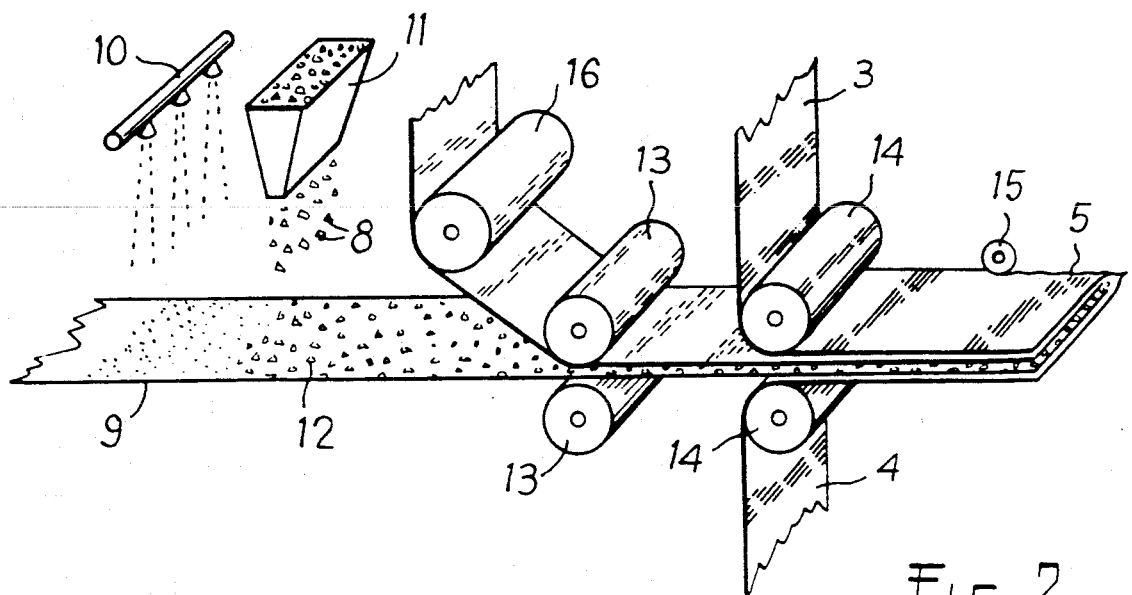
Fig_2
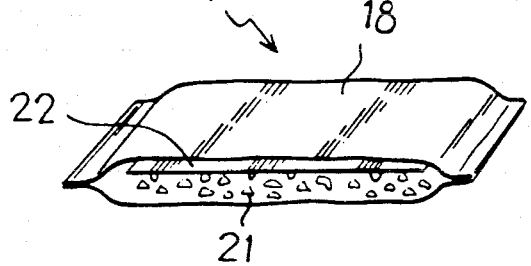
Fig_3
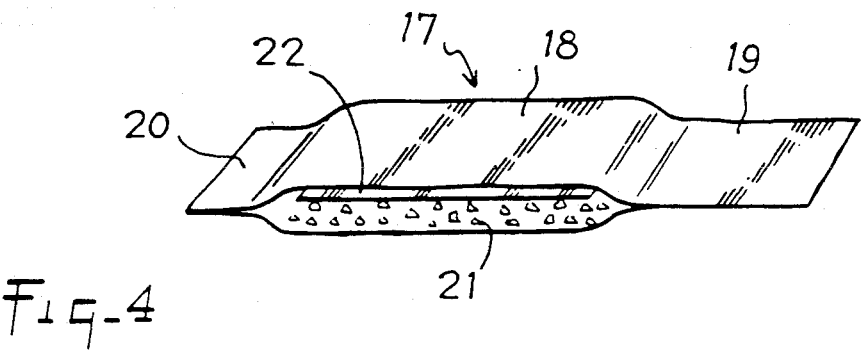
Fig_4

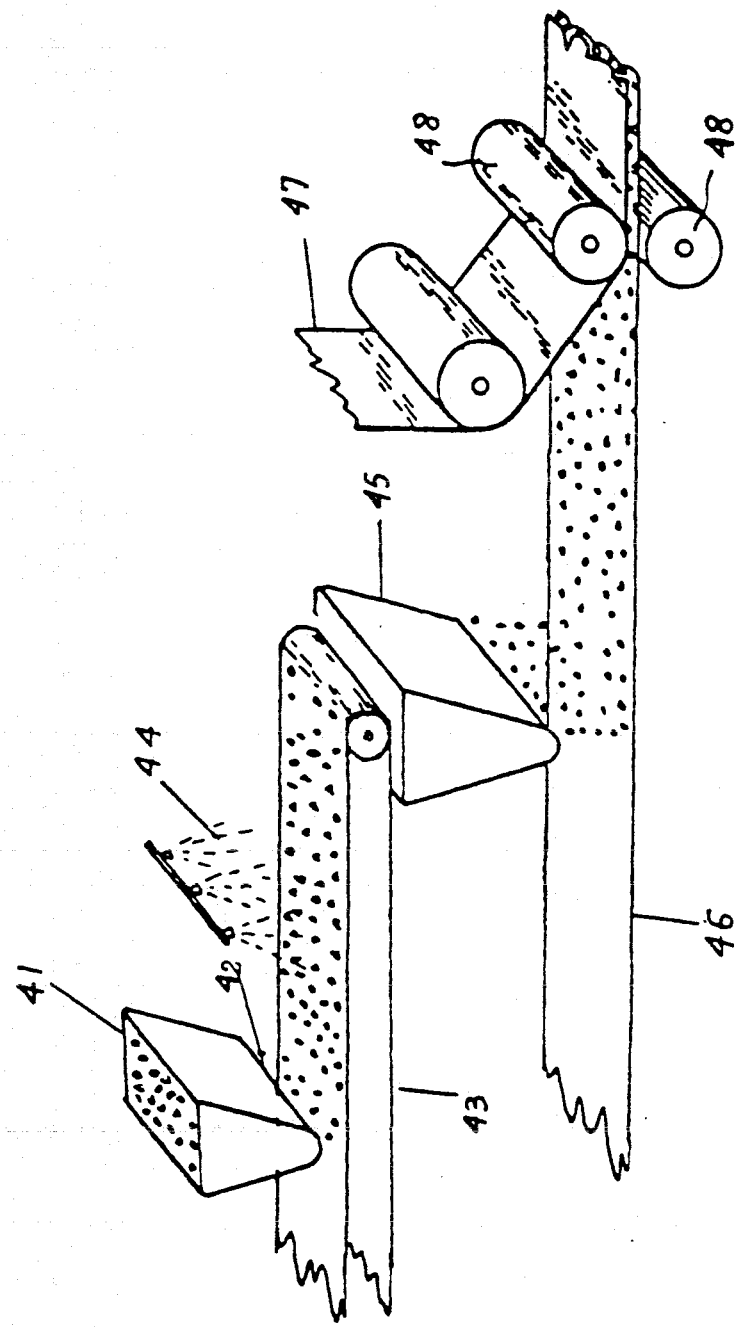

SUPPORT FOR OUT-OF-GROUND CULTIVATION COMPRISING SUPERABSORBENT PARTICLES AND METHOD OF PRODUCTION

The invention involves a cultivation support which can be used in the field of out-of-ground cultivation.

Out-of-ground cultivation offers numerous advantages, which explains its present development.

Numerous devices have already been proposed to implement this type of cultivation.

Document FR 2 416 643 describes a closed envelope, in the form of a strip, containing the cultivation medium, the envelope itself consisting of a material through which the roots can pass. In use, a given length of the strip is spirally wound around the plant.

Document GB 978 588 describes a closed envelope, normally tubular in shape, for example polyethylene, containing the cultivation substrate. This envelope is provided with openings through which the plants to be cultivated are inserted.

Another form of the invention, different to that described above, in the above-mentioned documents, consists in the production of stratified mats.

Document FR 2 400 883 describes a mat intended for the growth of vegetables on the ground, consisting of a base sheet, normally in rough silk paper, or slashed paper, to increase its contact with the subsequent surfaces, covered with seeds attached by an appropriate adhesive, which are themselves covered by a layer of compressed and dried turf, so as to form a bed of seeds mixed with the particles of compressed turf. The mat is then completed by depositing a further adhesive layer, followed by a layer of fibrous non-woven pile. In this case, the pile protects the seeds.

Document WO 85/01418 describes a mat consisting of two cushions, formed from lignocellulose non-oriented short fibres; the two superimposed cushions are bound by an adhesive. Various additives and seeds are sandwiched between these two cushions.

Elsewhere, reference is made to "superabsorbent" particles, since these absorb several tens of times their weight in aqueous liquid. A non-exhaustive inventory of these particles can be found in the French patent application 2 543 001. In particular, these particles are used in hygienic items for children or adults, to offer better retention of body fluids. These superabsorbents have also been proposed for domestic and even industerial cultivation purposes, since they offer the advantage of storing water, to which various elements favorizing vegetable growth can be added. However, insofar as professional use in the out-of-ground cultivation field is concerned, the applicant is not aware of devices enabling implementation of such particles. The documents mentioned and discussed above do not describe devices using superabsorbents, and moreover do not describe or suggest methods enabling incorporation of such particles in a manner in which they can be used as efficiently as possible.

Consequently, and specifically, the object of the invention is to propose a support comprising superabsorbents for professional or domestic use. This device offers numerous advantages:

- very low bulk product, with resulting important savings in transportation costs from the place of preparation to the place of use;
- possibility of using a thin film envelope, due to the low weight of the dry substrate, and therefore increased economy;
- very clearly improved safety with respect to gutter cultivation, in the event of failure of the drop-by-drop watering system, due to the pad effect provided by the superabsorbents.
- rapid regular growth of the plant, resulting from constant availability of the nutrient solution. The nutrient elements are continuously restored by the superabsorbents. This rapid growth provides 10 to 30% percocity with respect to modern methods at present in use.
- very easy and rapid installation on the ground;
- mobility of the device, which can be removed after cultivation (in the event of return to full soil, or changeover to cultivation of different density);
- efficient and stable ventilation of roots due to the properties of the recommended superabsorbents.

According to the invention, the characteristic of the culture support is that it consists of an envelope in waterproof material, inside which a layer of superabsorbent particles is fixed and regularly distributed.

The waterproof envelope consists of a material through which the roots cannot pass, such as polyethylene, and may consist of two edge-welded sheets. The envelope can take the form of a long lengthwise strip, or conversely, in the form of a single unit of low dimensions or a module.

Depending on climatic conditions, this envelope may be black or, conversely, reflect light. In all cases, the envelope will be opaque to light.

As already stated above, the superabsorbent particles are well known in the field, and the invention is not in any way limited to a particular type of particle. Generally, particles such as those described in the French patent demand No. 2 543 001 of the depositing company can be used. Of these, however, it is advantageous to use polyacrylamid-based particles, preferably in a mixture of 1 to 20% in weight of cationic polyacramide, in fine powder, so as to improve capillarity between the particles of anionic polyacrylamid. To ensure optimum development of plants, the substrate must offer adequate air retention, preferably greater than 10% of the volume of the substrate.

As shown in the table appended, we have been able to highlight a close relationship between the porousness in air of polyacrylamide hydrogels and the two following characteristics:

1) the reticulation factor of the polymer
2) the granulometry of the polymer particles.

| Granulometry in mm | Air retention | |
|---|---|---|
| | $1 < G < 3$ | $0.5 < G < 1$ |
| Polyacrylamid * I | 21% | 1% |
| Polyacrylamid * II | 10% | 0% |

Polyacrylamid I = strongly reticulated copolymer
Polyacrylamid II = weakly reticulated copolymer.

Consequently, the substrate preferably recommended shall consist of a polyacrylamide - polacrylic acid reticulated copolymer, in the form of grains of 0.5 to 4 mm in diameter, or in the form of fibres of 0.01 to 0.02 mm in diameter and 5 to 20 mm in length.

Although the surface mass of the superabsorbent layer is not critical, it is necessary to distribute the particles regularly and so that the particles are separate from each other, so that the latter can conserve their individuality and swell without hindrance. It is advantageous to deposit the particles at a rate of 100 g to 800 g per sq.m. It is also possible to add particles or fibres intended to improve the capillarity between the superabsorbent particles. For example, mineral particles such as: clay, bentonite, zeolite, or natural fibres such as ligneous or cellulose fibres, or synthetic fibres such as textile fibres, mineral wool, etc.

In addition, the role of the layer consists in facilitating wetting of the polymer by better diffusion of the irrigation water coming from the timed watering system, of the drop by drop type.

The invention also concerns a production process for the complex consisting of the superabsorbent particles and the two natural or synthetic fibre sheets, intended to be incorporated into an envelope of waterproof material, to form an out-of-ground cultivation support. This particularity of this process is that it partially wets the superabsorbent particles consisting of grains of diameters of between 0.2 and 0.5 mm and/or fibres of diameter of between 0.02 and 2 mm and lengths of between 5 and 20 mm so as to provide these with an adhesive capability, depositing and regularly distributing these particles on one of the sheets, then placing the other sheet on the layer of particles, by compressing the sheets.

Another objective of the invention is the use of a cultivation support, a special feature of which is that one or more openings are made in one of the surfaces of the envelope, in which one or more cultivation clods containing a plant are inserted, and to which the nutrient solution required for the growth of the plants is added.

When wetting the bag or rollout strip, the polymer swells and occupies a volume 60 to 100 times greater than the initial volume.

It is also possible to mark the locations at which the openings are to be made on the supports, and even mark a precutting line. Also, by means of holes, it is possible to draw off excess nutrient solution.

Other characteristics and advantages of the invention will be better understood on reading the description which follows concerning the two production methods, and by referring to the appended drawings, in which:

FIG. 1 is a transverse cross-section of two cultivation supports (FIGS. 1A and 1B) according to a first variant of the invention.

FIG. 2 is a diagrammatic representation of a device enabling the support, according to FIG. 1A, to be manufactured.

FIG. 2A is a diagrammatic representation of a device enabling fabrication of the superabsorbent - supporting sheet complex, other than that shown in FIG. 2.

FIG. 3 is a transverse cross-section of a cultivation support, according to a second variant of the invention.

FIG. 4 is a transverse cross-section of a cultivation support, according to the second variant of the invention, equipped with a mulching film.

Figure 5:
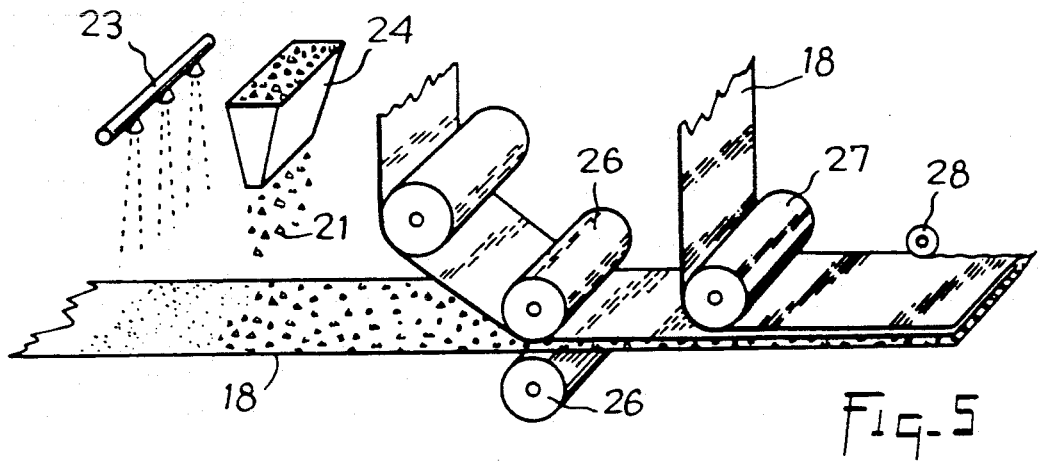
FIG. 5 shows a device enabling fabrication of the support, as shown in FIG. 3.

As shown in FIG. 1, cultivation support 1 consists of a flexible polyethylene envelope 2. According to the first fabrication method (FIG. 1A), envelope 2 consists of two sheets, 3 and 4, welded along their longitudinal edges 5 and transverse edges (not shown), and, according to the second fabrication method (FIG. 1B), envelope 2 is formed by folding a polyethylene sheet 6, and welding the longitudinal edges 7; the width of polyethylene sheet 6 is double that of those used for the envelope shown in FIG. 1A.

The uniformly distributed superabsorbent particles 8 are contained inside these envelopes 2. These particles are sandwiched between two supporting sheets 9, in cellulose wadding, and these are fixed by using the adhesive properties of the superficially moistened superabsorbent particles, which can be obtained by preliminary wetting of one of the sheets of cellulose wadding. If necessary, this sandwich structure can be calendered to improve attachment.

As a replacement for the cellulose wadding sheets, it is possible to use sheets of synthetic material such as polyurethane foam, natural fibre or synthetic structures or similar products. In this case, particle attachment is ensured by spraying a well-known adhesive onto one of the sheets before depositing the particles, or by using heat bonding.

According to FIG. 2, representing a first fabrication method, a continuous band of cellulose wadding 9 moves over a translating support (not shown). From the beginning to the end of the production line, sheet 9 is wetted by a spraying system 10, then hopper 11 deposits layer 12 of superabsorbent particles 8. The sheet then passes between two compressor rollers and calendering devices 13, one of which, by means of idler roller 16, brings a second sheet of cellulose wadding over layer 12. The sandwich structure thus formed can then pass between two rollers 14, respectively located above and below the said structure, each of which brings in a polyethylene sheet 3 and 4. Finally, heating rollers 15, located at the longitudinal edges 5, weld these edges. Instead of forming the envelope directly after fabrication of the complex, it is possible to produce the cultivation support in two stages. First of all, the complex is produced, and its envelopment completed later on, as required.

FIG. 2A illustrates another fabrication process for the complex consisting of superabsorbent polymer particles applied to the surface of a film of cellulose wadding, or sandwiched between two sheets of cellulose wadding. According to this process, the intrinsic properties of the recommended polymer binder are used more efficiently at the start of the partial wetting phase. From the beginning to the end of the production line, the superabsorbent polymer is measured by measuring device 41, which distributes particles 42 in a uniform layer over conveyor 43. The polymer particles are wetted by spraying system 44, located above the conveyor. A distributor 45 then deposits the hydrated polymer particles onto the surface of cellulose wadding film 46. A second film 47 is then applied to the surface of the polymer-cellulose wadding complex, and the whole is calendered between two rubber-coated presser rollers 48.

It is possible to envelope the complex thus obtained immediately at the outlet from rollers 48, or carry out operation at a later stage.

Preferentially, the wetting operation performed by the spraying system 44 will correspond to a volume of water of between 15 and 60% of the dry polymer. To optimize the adhesive properties of the polymer, the period between wetting and spreading of the polymer on its support will preferentially be between 5 and 60 seconds.

The advantages of this production method as compared to the methods of FIG. 2, which consist in wetting the support and not the polymer, are multiple:

bonding is improved and uniform over both sides of the polymer-cellulose wadding sandwich.

the production rate can easily be accelerated, the polymer wetting time being independent of the rate of movement of the paper.

since the cellulose support is not directly wetted, it is possible to use low weight films (of the order of 20 g/sq.m), as opposed to conventional methods, which frequently use supports of 40 to 80 g/sq.cm.

As shown in FIG. 3, support 17 is formed in the same way as the support shown in FIG. 1A, of two superimposed polyethylene sheets 18 welded along their edges. In the case shown in FIG. 4, one of the sheets is much wider than the other, allowing a part 19, used as a mulching film, to protrude from one side, and a strip 20, much narrower than part 19, to protrude from the other side.

A layer of superabsorbent particles directly laid on the bottom sheet, and attached to it by means of an adhesive, is placed inside these envelopes. This layer is covered with a sheet of cellulose wadding 22, for example, enabling better distribution of the liquid.

As shown in FIG. 5, polyethylene sheet 18 moves over a translating support (not shown). From the beginning to the end of the production line, this is covered with adhesive by means of spraying system 23, then the superabsorbent particles 21 are deposited by means of a hopper 24. A sheet of cellulose wadding 22 is laid by means of idler roller 25 and two pressor rollers 26 on layer 21 (in the same manner as FIG. 2). Then, sheet 18 is deposited on sheet 22 by roller 27. As for the process described in FIG. 2, the edges are welded by means of heating rollers 28.

Figures 6A, 6B:
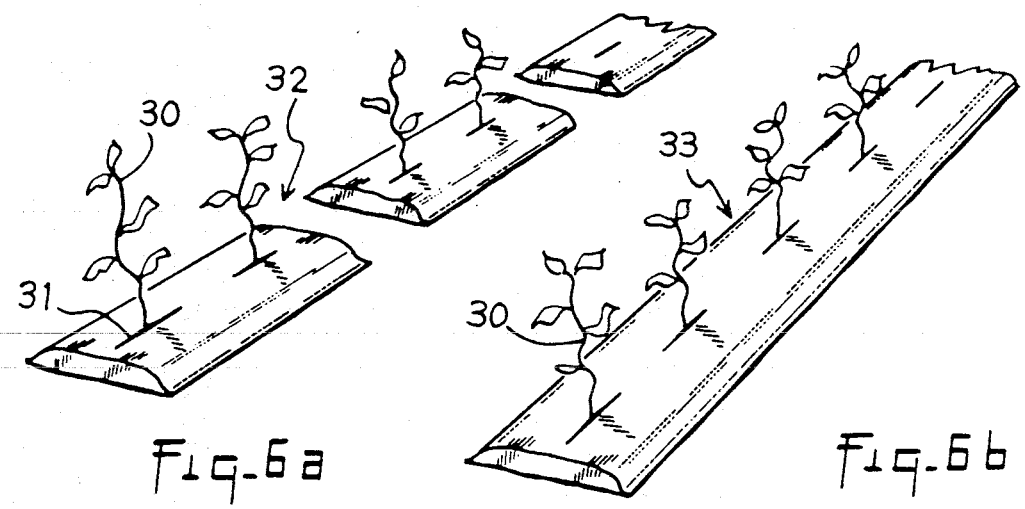
FIG. 6 is a perspective view of supports containing plants, FIG. 6A being a view of the supports in the form of individual modules, and FIG. 6B a view of a support consisting of a continuous strip or band.
Figures 7, 8:
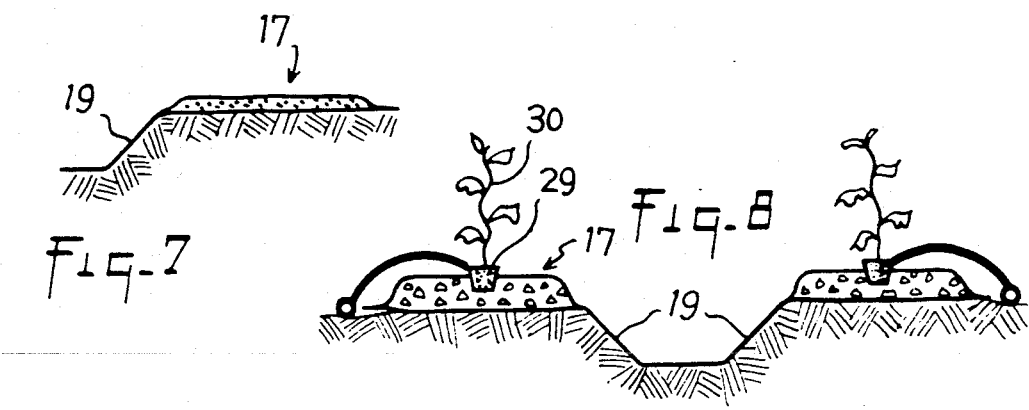
FIG. 7 is a transverse section of a support with a mulching film laid on the ground.
FIG. 8 is a transverse section of two supports with a mulching film placed on the ground, containing watered plants.

To use the supports described above, these are laid on flat soil, bordered, if necessary, by a draining channel, as shown in FIG. 7, strip 19 covering this channel. A clod 29, containing plant 30, is inserted in slots 31 provided for this purpose, as shown in FIG. 6A, 6B and 8. The support can consist of individual modules 32 (FIG. 6A) or a continuous strip 33 (FIG. 6B).

The liquid feed can be provided by means of a drop-by-drop fertilizing irrigation network (preferably of the capillary type). The network may be external and comprise distribution conduits running lengthwise alongside the supports. Capillary tubes, each of which supply plants, are mounted on the conduits. It is also possible to provide an integrated system in which the liquid distribution conduits are built into the supports, which then consist of continuous strips or bands.

In the case shown in FIG. 8, particularly, the supports, together with the mulching film, are laid on either side of a draining channel, covered with the said films, which are partly superimposed on each other. The clods are then watered, so as to enable expansion of the gel, leading to the formation of the desired reserve of water.

The invention, of course, is not limitative, and professionals can incorporate modifications without leaving their field.

We claim:

1. A cultivation support for use in the field of out-of-ground cultivation comprising an envelope made of a waterproof material and a layer of superabsorbent particles contained in said envelope, said superabsorbent particles being uniformly distributed on and fixed to a support wherein said support is a holding sheet separate from said envelope or the internal lower surface of said envelope.

2. The cultivation support of claim 1 which includes a water-permeable sheet material on the upper surface of said superabsorbent particles.

3. The cultivation support of claim 1 or 2 wherein the separate holding sheet is a foam material.

4. The cultivation support of claim 1 or 2 wherein the separate holding sheet is a natural or fibrous structure.

5. The cultivation support of claim 4 wherein the holding sheet is cellulose wadding.

6. The cultivation support of claim 1 or 2 wherein the superabsorbent particles are fixed to the supporting sheet by a bond obtained by wetting of the superabsorbent particles.

7. The cultivation support of claim 1 or 2 wherein the superabsorbent particles take the form of grains of diameters of between 0.5 and 4 mm, or fibers of from 0.01 to 0.2 mm in diameter and 5 to 20 mm in length.

8. The cultivation support of claim 1 or 2 wherein the superabsorbent particles are polyacrylamide based.

9. The cultivation support of claim 1 or 2 wherein the superabsorbent particles are distributed in quantities of 100 g to 800 g per sq.m.

10. The cultivation support of claim 1 or 2 wherein the superabsorbent particles are presented as a mixture with a filler material which will distribute water by capillary action.

11. The cultivation support of claim 1 or 2 having one or more openings in one of the surfaces of the envelope in which one or more cultivation clods containing a plant can be inserted and the necessary water for the growth of the plant can be added.

12. The cultivation support of claim 9 wherein the superabsorbent particles are presented as a mixture with a filler material which will distribute water by capillary action.

* * * * *